UNITED STATES PATENT OFFICE.

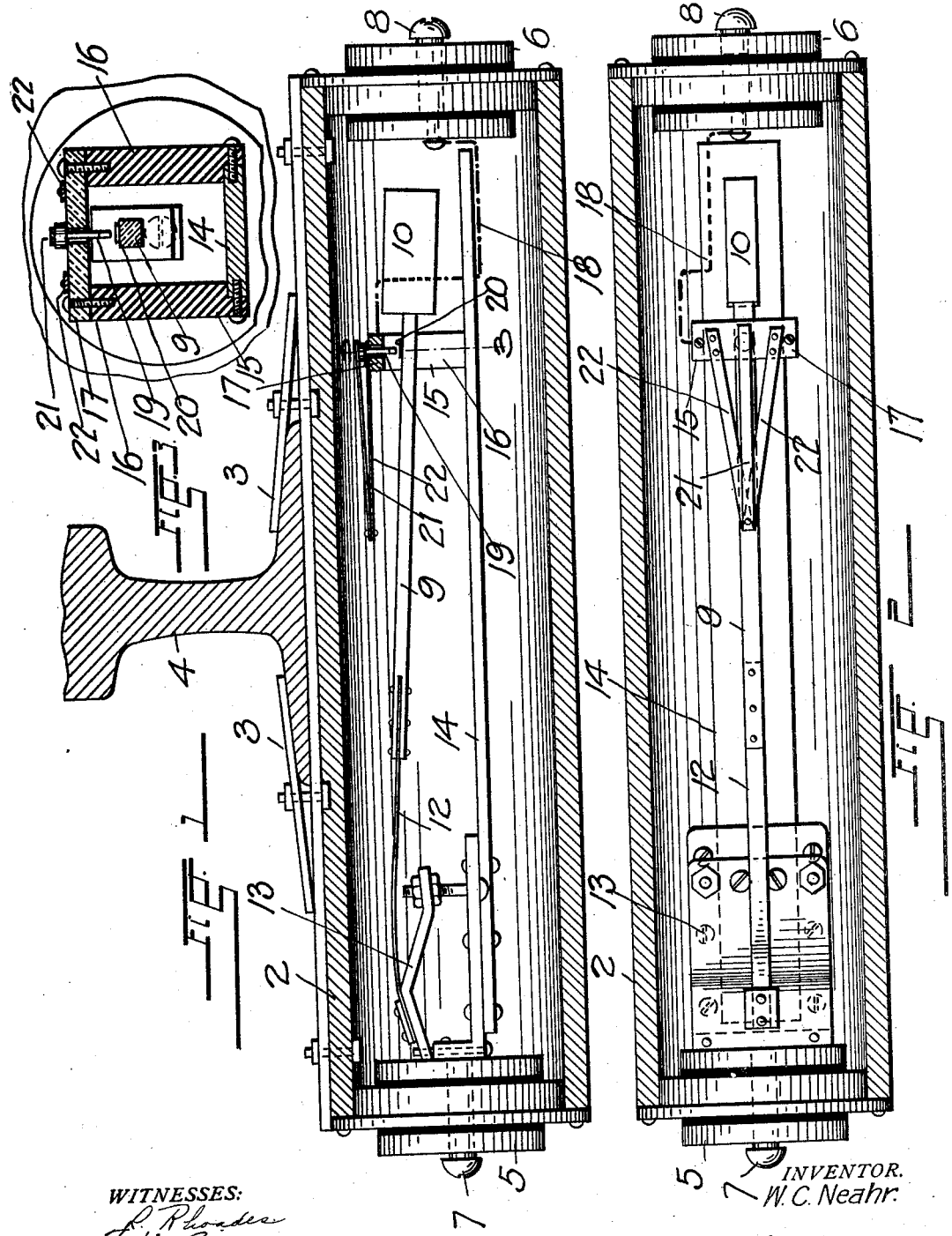

WILL C. NEAHR, OF DENVER, COLORADO, ASSIGNOR, BY MESNE ASSIGNMENTS, TO THE PROTECTIVE SIGNAL MANUFACTURING COMPANY, A CORPORATION OF COLORADO.

CIRCUIT-CLOSING INSTRUMENT.

1,102,944. Specification of Letters Patent. Patented July 7, 1914.

Application filed April 17, 1912. Serial No. 691,444.

*To all whom it may concern:*

Be it known that I, WILL C. NEAHR, a citizen of the United States of America, residing at Denver, in the county of Denver and State of Colorado, have invented certain new and useful Improvements in Circuit-Closing Instruments, of which the following is a specification.

My invention relates to circuit closing instruments of the type in which a vibratory element will, under the influence of forces of restitution, cause a normally open electric circuit to be intermittently closed, when its equilibrium is disturbed. While an instrument of this character is adapted to be effectively employed for various purposes, it is more particularly designed for use in connection with a railroad track, to be actuated by the jarring motion of a passing train or engine, for the purpose of visibly or audibly announcing the approach thereof at a station, crossing or other distant point along the line, through the instrumentality of a signaling appliance located in the electric circuit in which the circuit-closing instrument is connected. Inasmuch as the tremulous movement imparted to the track varies in its intensity in accordance with the weight and velocity of the moving body supported thereon, it will be readily understood that an instrument of the class described, to be practical and operative under all conditions, must necessarily be durable and positive in its action as well as sensitive to a high degree, and it is the object of the present invention to provide a circuit-closing instrument of the type referred to in which these different characteristics are successfully combined by a mechanism which while simple and durable in construction will respond to the slightest disturbance of the track or other support to which it is attached, and which, irrespective of the amplitude or frequency of the movement of its vibrative element, will not only intermittently close the electric circuit in which it is connected, but prolong the closing action during a period sufficiently long to positively effect the operation of the signaling appliance located in the circuit. I attain this object by the mechanism illustrated in the accompanying drawings in the various views of which like parts are similarly designated and in which, Figure 1 represents a side elevation of my improved mechanism, in which the casing which incloses the same has been shown in section, Fig. 2 a plan view of the construction shown in Fig. 1, and Fig. 3 a transverse section taken along the line 3—3, Fig. 1 and drawn to an enlarged scale.

Referring more specifically to the drawings, the reference numeral 2 designates a preferably cylindrical casing which is provided with a suitable clamping appliance 3 by means of which it may be fastened to the rail 4 of a railway track. The casing 2 is closed at its ends by means of heads 5 and 6 which are provided with binding screws 7 and 8 to connect the conductors of electricity of the circuit in which the instrument is located. The heads are constructed to allow an uninterrupted flow of electricity between the parts of the mechanism secured thereto within the casing, and the respective binding-screws, and their conducting parts are, to this end, insulated from the casing.

The circuit closing mechanism comprises a vibratory element which is composed of a bar 9 which carries at one of its ends a poise 10 and whose opposite extremity is attached to a leaf spring 12 which is secured upon a bridge 13 supported upon a flat bar 14 which is connected with one of the heads 5, and extends longitudinally through the casing to a point in proximity to the opposite head 6. A frame 15 supported on the bar 14, is composed of two uprights 16 of non-conducting material and a conductive cross piece 17, and straddles the bar 9 of the vibratory element in proximity to the poise thereof. The cross-piece is electrically connected with the head 6 opposite to that to which the bar 14 is fastened, by means of a wire 18 which in the drawings, has been designated by a dash dot line. A headed contact pin 19 projects loosely through a vertical aperture in the cross piece 17 upon which its head is normally supported and when the parts of the instrument are in a condition of rest, the point of this pin which is preferably provided with a platinum tip, is disposed above and in spaced relation to a platinum contact-plate 20 on the bar 9, which through the medium of the bridge 13, the bar 14 and the head 5 to which the latter is attached, is in continual electric communication with the conductor of electricity connected to the binding screw 7 on the said head. The head of the vertically movable pin 19 is engaged at its upper surface by the end of a leaf spring 21 which, at its opposite extremity, is supported upon the connected ends of two convergently disposed, resilient blades 22, which extend laterally from the cross-piece 17 of the frame 15 to which their opposite, separated ends are secured. This construction serves the twofold purpose of insuring a continual flow of electricity from the cross-piece 17 to the contact pin by means of the blades 22 and the spring 21 and of restricting the upward motion of the pin when it is lifted by engagement of the plate 20 on the bar 9 during the oscillatory movement thereof.

When by a shock or jar imparted to the support with which the casing 2 is connected, the equilibrium of the vibratory element is disturbed, its contact plate 20 is moved in engagement with the superposed point of the movable contact pin 19, thus closing the circuit of which said plate and pin are terminals. During the upward motion of the bar 9, the pin 19 after having been engaged by the plate 20, is lifted against the pressure of the spring 21, until the bar has reached the limit of its upward motion, when during subsequent downward movement thereof, the pin will remain in contact with the plate until its head has again come in engagement with the surface of the frame upon which it is normally supported. It will thus be observed that during each vibration of the bar 9, its contact plate is positively brought in contact with the pin 19 and that this contact is prolonged to an extent which insures the operation of the electric alarm or other signaling appliance located in the electric circuit of which the said plate and the said pins are terminals.

Having thus described my invention what I claim and desire to secure by Letters-Patent is:

1. In a circuit closing instrument, a vibratory element, a contact member disposed in the path of said element to be lifted during vibrating movement of the same, a support for said member, a resilient blade on said support, a spring on said blade in engagement with said member to yieldingly oppose upward motion thereof, and means for connecting said spring and said element at opposite sides of an electric circuit.

2. In a circuit closing instrument, a resilient element fixed at one of its ends to vibrate in a vertical plane, a contact member normally held against gravitation in the path of said element, to be lifted by upward movement of the same, a spring engaging said member to yieldingly oppose upward movement thereof, and a resilient support for said spring, said element and said member being adapted for connection in opposite sides of an electric circuit.

3. In a circuit closing instrument, a support, a resilient conductive element mounted thereon to vibrate by a jarring motion of said support, and a contact member disposed to be engaged by said element during its movement in one direction and adapted to move with said element to prolong said engagement, said element and said member being adapted for connection in opposite sides of an electric circuit.

4. In a circuit closing instrument, a support, a resilient conductive element mounted thereon to vibrate by a jarring motion of said support, a contact member disposed to be engaged by said element during its movement in one direction and adapted to move with said element to prolong said engagement, and a spring adapted to yieldingly oppose the said movement of the contact member, said element and said member being adapted for connection in opposite sides of an electric circuit.

5. In a circuit closing instrument, a support, a resilient conductive element mounted thereon to vibrate by a jarring motion of said support, and a loosely suspended contact member normally separated from said element and disposed to be lifted by the same during its upward motion, said element and said member being adapted for connection in opposite sides of an electric circuit.

6. In a circuit closing instrument, a support, a resilient conductive element mounted thereon to vibrate by a jarring motion of said support, a loosely suspended contact member normally separated from said element and disposed to be lifted by the same during its upward motion, and a spring engaging said member to yieldingly oppose its upward motion, said element and said member being adapted for connection in opposite sides of an electric circuit.

In testimony whereof I have affixed my signature in presence of two witnesses.

WILL C. NEAHR.

Witnesses:
 D. B. TURNER,
 G. J. ROLLANDET.

Copies of this patent may be obtained for five cents each, by addressing the "Commissioner of Patents, Washington, D. C."